July 7, 1964

J. B. THOMAS 3,139,902

HANDLE STRUCTURE FOR PRESSURE-REGULATOR
AND GAUGE FOR GAS CYLINDERS

Filed March 14, 1961

INVENTOR:
JIM B. THOMAS
BY
Ralph F. Staubly
ATTORNEY 3,139,902
HANDLE STRUCTURE FOR PRESSURE-REGULATOR AND GAUGE FOR GAS CYLINDERS
Jim B. Thomas, 1902 Church St., Nashville 3, Tenn.
Filed Mar. 14, 1961, Ser. No. 95,650
3 Claims. (Cl. 137—557)

This invention relates to a combined handle, gauge and pressure-regulator for gas cylinders.

More particularly the invention pertains to a combined handle, pressure gauge and pressure regulator for gas cylinders, comprising: a body of hand-grip size and shape adapted for coupling to the outlet of a conventional manual valve as to radially overlie the cylinder top for easy carrying thereof, said body housing an adjustable pressure-regulating valve and a tank-pressure-indicating gauge all substantially non-protrudingly protectedly incorporated into said body.

It is accordingly the principal object of the invention to provide a combined device of this type which is very compact, rugged, and economical in initial cost and in upkeep. This and other objects and advantages will become apparent as the following detailed description proceeds.

Figure 1:
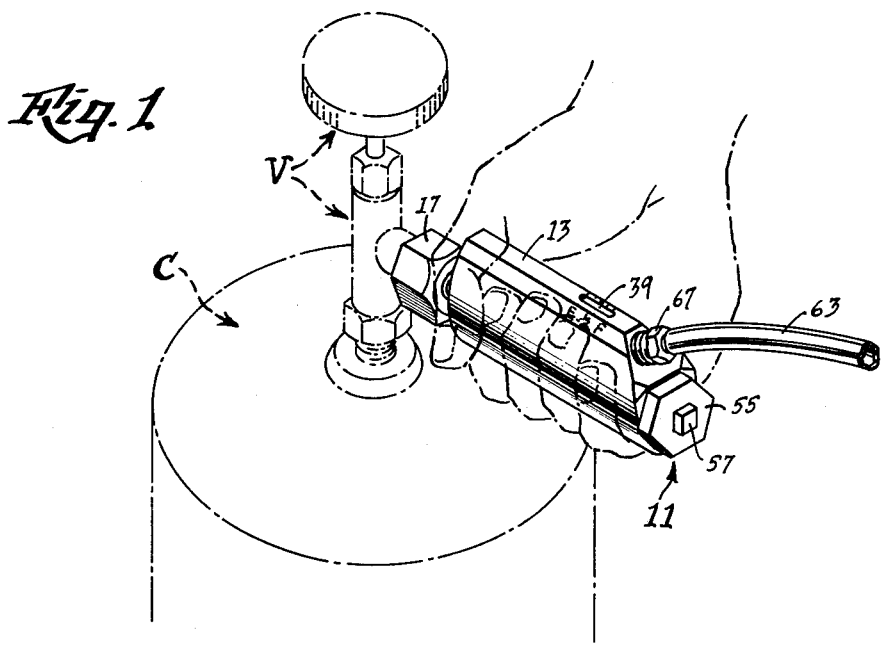
FIG. 1 is a perspective view of a preferred embodiment of the invention.
Figure 2:
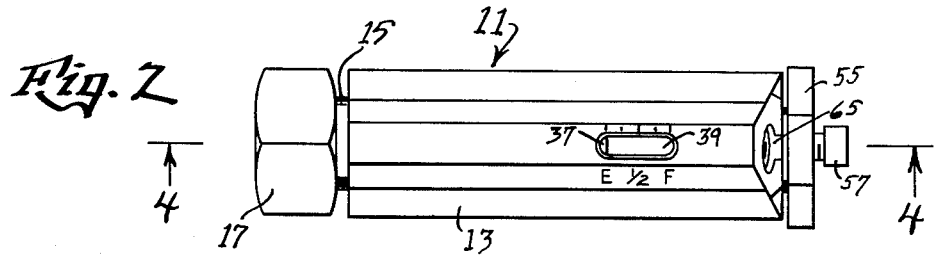
FIG. 2 is an enlarged plan view of the unit of FIG. 1.

With reference now to the drawings, the numeral 11 generally designates the handle-forming unit as a whole. Unit 11 comprises a body member or a hand-grip-fitting casting 13 of brass or other suitable alloy, having a substantially egg-shaped cross-section and bored at its front end to receive the reduced-diameter shaft of the coupler 15. Coupler 15 has a union-forming enlarged head 15h of conventional construction for rigid connection with the valve V of the gas cylinder C by the union nut 17. The shaft 15s of coupler 15 is threaded at its rear (right) end for co-operation with the threads cut into the reduced-diameter rear end of the bore 13b, thus leaving a gas-circulating clearance passage 19 sealed from the atmosphere at its forward end by the gasket ring 21 of soft metal or other suitable material. When the valve V is opened, gas (for example acetylene, propane, oxygen, air, etc.) flows through the inlet or axial bore 15b to both the pressure-regulating valve (axially to the right of said bore and hereinafter described in detail) and laterally through radial bore 15r into chamber 19 for conduction thereof by bore 13g to the pressure-indicating gauge longitudinally disposed in the upper third of the handle unit 11 and next to be described.

The pressure gauge (which may be calibrated in any desired values, such as the full "F" to empty "E" scale shown) comprises (1) the pressure cylinder or chamber 23 sealed by removable threaded plug 25, and (2) the piston-forming rod 27 having an integral kerfed head 27h thereon serving as a stop for the piston-biasing compression coil spring 29. The other end of spring 29 embraces the hub of the flanged packing gland 31 and compresses the sealing washer 33 between itself and the washer 35 seated against the rear wall of the chamber 23, said wall and elements 31–35 being axially apertured to slidably receive and guide piston 27. The rear end of piston 27 is threaded to receive thereon the kerfed cylindrical nut 37 which serves both as a stop (in the position shown) and as the movable indicator visible in the window 39 formed in the top of the longitudinal bore 70.

Figures 3, 4:
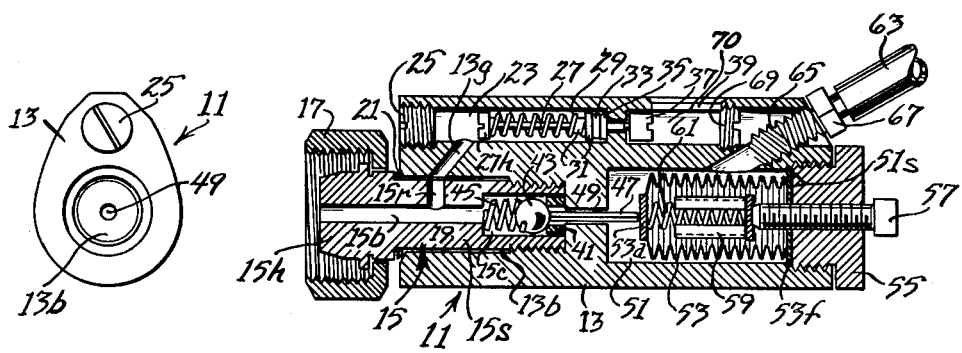
FIG. 3 is an end view of the unit from the left of FIG. 2 and with the valve structure proper removed.
FIG. 4 is an elevational view in section taken on the line 4—4 of FIG. 2.

The pressure-regulating valve comprises (1) a self-closing valve located in the front half of the handle, (2) an adjustable pressure-responsive device located in the rear half of the handle, and (3) a push rod operated by the latter to open the former when the output gas pressure drops below the preselected constant output pressure. The self-closing valve comprises: an enlarged axially bored chamber 15c in the rear end of the coupler 15, a valve seat in the form of a washer 41 of tough resilient plastic material, a (metallic) ball 43 sealingly seating on said washer, and a compression coil spring 45 pressing said ball into the valve-closing position shown in FIG. 4. Ball 43 is engaged by a non-circular push rod 47, centered loosely in the bore 49 connecting the valve proper to the output chamber 51. Push rod 47 is actuated by the pressure-responsive bellows 53 (made for example of brass). Bellows 53 is loosely centered in said chamber 51 by its outwardly flanged rear end 53f, which can also serve as a sealing gasket (or a seat for one) compressed between the seat 51s and the rim of the front face of plug 55. Plug 55 is screwed into the enlarged internally threaded rear portion of the cylindrical output chamber 51, and carries a coaxially threaded adjusting screw 57 engageable against the closed end of the spring-embracing (split) sleeve 59, which serves as a protective stop for preventing collapsing damage to the bellows 53 in the event of failure of valve 41–45 to close. Sleeve 59 holds the spring 61 variably compressed against the front wall of bellows 53 (depending upon the adjustment of screw 57) to overcome some of the forces exerted upon bellows 53 by gas pressure in chamber 51. The front wall of bellows 53 is desirably reinforced by a disk 53d soldered or otherwise held in place.

A flexible outlet conduit 63, connected to chamber 51 by the acutely angled threaded bore 65 and the threaded coupler 67 screwed thereinto, conducts the pressure-controlled gas to the apparatus (torch, burner, etc., not shown) to be operated thereby. A kerfed plug 69 seals the gauge-access bore 70 at the rear end of window 39 to prevent loss of gas thru the intersecting bores and said window.

While I have disclosed a preferred embodiment of my invention, it is to be understood that many changes can be made in the size, shape, composition and arrangement of the parts without departing from the spirit of the invention as defined by the subjoined claims.

Having thus described my invention, I claim:

1. A handle structure for containing a pressure-regulator and a pressure gauge comprising:
    (a) an elongated body member having a front end, a rear end, an upper portion and a lower portion,
    (b) said body member having a transverse substantially ovoid cross section, said upper portion being narrower than said lower portion, to adapt said body member to be comfortably gripped by an adult, human hand,
    (c) a fluid input chamber in said lower portion adjacent said front end,
    (d) a fluid output chamber in said lower portion adjacent said rear end,
    (e) valve means in said lower portion communicating said input chamber with said output chamber,
    (f) pressure-regulating means in said lower portion for controlling said valve means to open and close communication between said input chamber and said output chamber,
    (g) a pressure chamber in said upper portion having a longitudinal axis parallel to the longitudinal axis of said body,
    (h) a fluid passage between said input chamber and said pressure chamber,
    (i) a recessed window in said upper portion,
    (j) means in said upper portion visible through said window for indicating the pressure in said pressure chamber.

(k) an inlet in said front end communicating with said input chamber, and (l) an outlet in said rear end communicating with said output chamber, and extending upwardly and rearwardly from said body member at an acute angle with the longitudinal axis of said body member.

2. The invention according to claim 1 in which said outlet comprises a bore communicating with the upper portion of said output chamber and extending upwardly and rearwardly through said body member to the rear of said window.

3. The invention according to claim 1 further providing means for coupling said inlet to the radially-directed outlet of a valve of a gas cylinder to dispose said body member in radial alignment with said gas cylinder outlet across and spaced from the adjacent end of said gas cylinder.

References Cited in the file of this patent

UNITED STATES PATENTS

| | | |
|---|---|---|
| 1,668,681 | Kirlin | May 8, 1928 |
| 1,815,533 | Vincent | July 21, 1931 |
| 1,957,854 | Smith | May 8, 1934 |
| 2,408,976 | Forbragd | Oct. 8, 1946 |
| 2,501,801 | Wallin | Mar. 28, 1950 |
| 2,635,623 | Moffett | Apr. 21, 1953 |
| 2,645,884 | Kellie | July 21, 1953 |
| 2,661,626 | Moffett | Dec. 8, 1953 |
| 2,666,278 | Matosovic | Jan. 19, 1954 |
| 2,768,643 | Acomb | Oct. 30, 1956 |
| 2,832,221 | Adams | Apr. 29, 1958 |
| 2,907,343 | Pinke | Oct. 6, 1959 |
| 2,963,034 | Cummins | Dec. 6, 1960 |